United States Patent
Akidau et al.

(10) Patent No.: US 11,593,345 B1
(45) Date of Patent: Feb. 28, 2023

(54) ACCELERATING CHANGE DATA CAPTURE DETERMINATION USING ROW BITSETS

(71) Applicant: Snowflake Inc., Bozeman, MT (US)

(72) Inventors: Tyler Arthur Akidau, Seattle, WA (US); Istvan Cseri, Seattle, WA (US); Fabian Hueske, Berlin (DE); Tyler Jones, Redwood City, CA (US); Yevgeniy Kogan, Kirkland, WA (US); Dzmitry Pauliukevich, Berlin (DE); Daniel E. Sotolongo, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/648,621

(22) Filed: Jan. 21, 2022

(51) Int. Cl.
*G06F 16/23* (2019.01)
*G06F 16/2455* (2019.01)
*G06F 16/22* (2019.01)

(52) U.S. Cl.
CPC ...... *G06F 16/2358* (2019.01); *G06F 16/2282* (2019.01); *G06F 16/2456* (2019.01)

(58) Field of Classification Search
CPC .................................................. G06F 16/2358
USPC ............................................................ 707/648
See application file for complete search history.

(56) References Cited

U.S. PATENT DOCUMENTS

| | | | |
|---|---|---|---|
| 2011/0225205 A1* | 9/2011 | Okamoto | G06F 16/2454 707/E17.057 |
| 2018/0068008 A1* | 3/2018 | Cruanes | G06F 16/2282 |
| 2018/0144014 A1* | 5/2018 | Mittal | G06F 16/2322 |
| 2018/0253467 A1* | 9/2018 | Gurajada | G06F 3/065 |
| 2020/0183908 A1* | 6/2020 | Muralidhar | G06F 16/2358 |
| 2020/0320060 A1* | 10/2020 | Jung | G06F 16/2379 |

* cited by examiner

*Primary Examiner* — Muluemebet Gurmu
(74) *Attorney, Agent, or Firm* — Schwegman Lundberg & Woessner, P.A.

(57) ABSTRACT

Techniques described herein can accelerate change data capture determinations such as stream reads, which show changes made to a table between two points in time. Three distinct row bitests that mark deleted, updated, inserted, rows in micro-partitions can be added as metadata for the table. These bitsets can be generated during DML operations and then stored as metadata of the new partition generated by the DML operations. The bitsets can then be used to generate streams showing the changes in the table between two points in time (changes interval).

18 Claims, 8 Drawing Sheets

STREAM OUTPUT

| VAL | ROW-ID | M$ACTION | M$UPDATE |
|---|---|---|---|
| 1 | A | INSERT | FALSE |
| 1 | A | DELETE | TRUE |
| 2 | A | INSERT | TRUE |
| 2 | A | DELETE | FALSE |

ACCELERATING CHANGE DATA CAPTURE DETERMINATION USING ROW BITSETS

TECHNICAL FIELD

The present disclosure generally relates to a network-based database system and, more specifically, to generating change data capture determinations, such as streams or virtual tables, using row bitsets.

BACKGROUND

Network-based database systems may be provided through a cloud platform, which allows organizations and users to store, manage, and retrieve data from the cloud. With respect to type of data processing, a database system could implement online transactional processing, online analytical processing, a combination of the two, and/or another type of data processing. Moreover, a database system could be or include a relational database management system and/or one or more other types of database management systems.

One such example is a cloud data warehouse (also referred to as a "network-based data warehouse" or simply as a "data warehouse"), which is a network-based system used for data analysis and reporting that comprises a central repository of integrated data from one or more disparate sources. A cloud data warehouse can store current and historical data that can be used for creating analytical reports for an enterprise. To this end, data warehouses can provide business intelligence tools, tools to extract, transform, and load data into the repository, and tools to manage and retrieve metadata.

Database data can be modified by various commands, including insert, delete, and update commands that modify one or more rows in a database table. It can be costly to track such modifications and to determine changed data information between a first set of database data and a second set of database data. In some instances, a user of the network-based database system may wish to analyze changes to database data at low cost.

BRIEF DESCRIPTION OF THE DRAWINGS

Various ones of the appended drawings merely illustrate example embodiments of the present disclosure and should not be considered as limiting its scope.

FIG. 7 illustrates a simplified stream, according to some example embodiments.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Techniques described herein can accelerate change data capture determinations such as stream reads, which show changes made to a table between two points in time. Three distinct row bitsets that mark deleted, updated, inserted, rows in micro-partitions can be added as metadata related to the table. These bitsets can be generated during DML operations and then stored as metadata of the partitions that were newly added and removed by the DML operations. The bitsets can then be used to generate streams showing the changes in the table between two points in time (changes interval). Instead of performing expensive join functions to reconcile row changes, the bitsets can be used to quickly identify which rows have been modified in the change interval.

Figure 1:
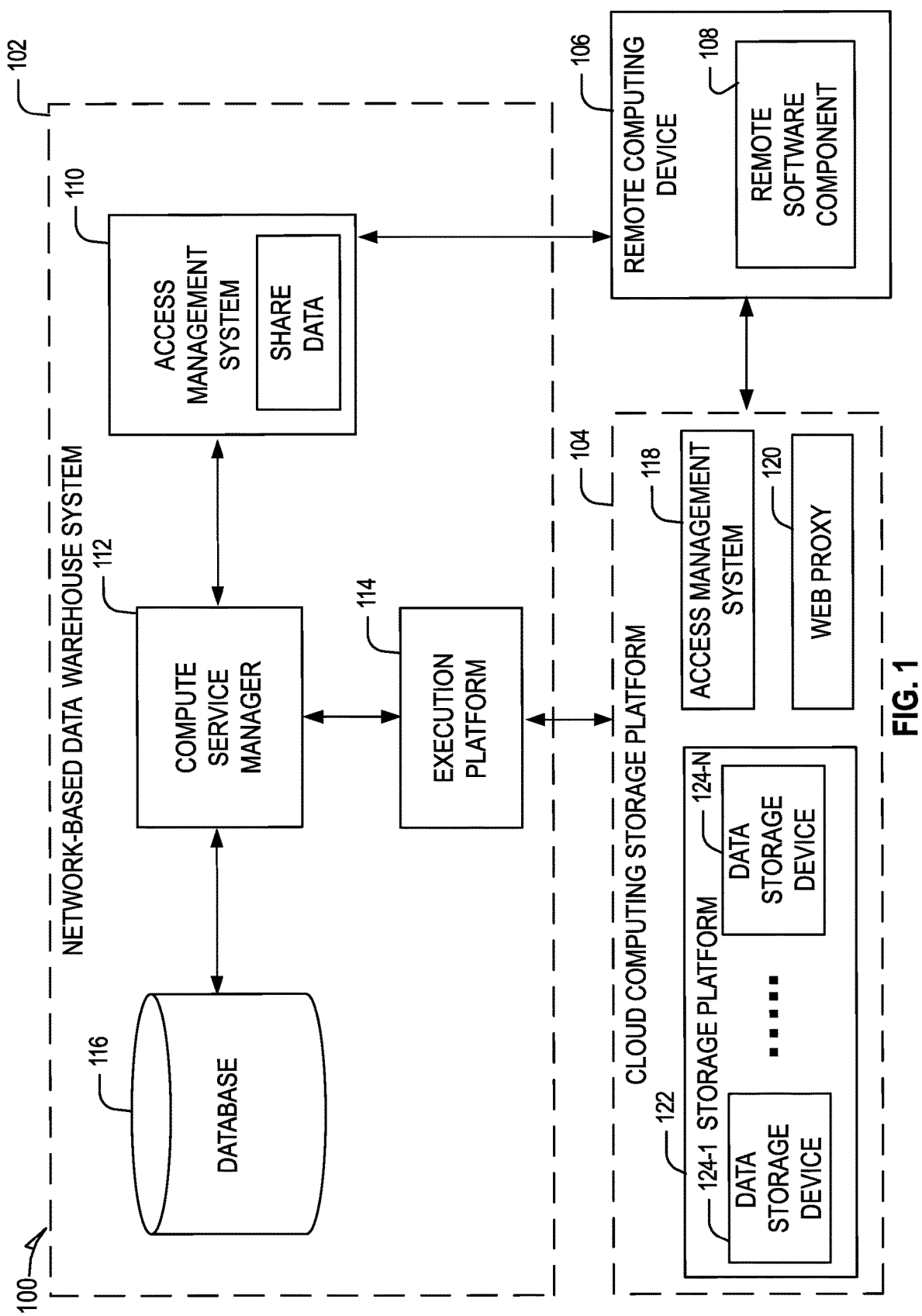
FIG. 1 illustrates an example computing environment in which a cloud database system can implement streams on shared database objects, according to some example embodiments.

FIG. 1 illustrates an example shared data processing platform 100. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the shared data processing platform 100 to facilitate additional functionality that is not specifically described herein.

As shown, the shared data processing platform 100 comprises the network-based database system 102, a cloud computing storage platform 104 (e.g., a storage platform, an AWS® service, Microsoft Azure®, or Google Cloud Services®), and a remote computing device 106. The network-based database system 102 is a cloud database system used for storing and accessing data (e.g., internally storing data, accessing external remotely located data) in an integrated manner, and reporting and analysis of the integrated data from the one or more disparate sources (e.g., the cloud computing storage platform 104). The cloud computing storage platform 104 comprises a plurality of computing machines and provides on-demand computer system resources such as data storage and computing power to the network-based database system 102. While in the embodiment illustrated in FIG. 1, a data warehouse is depicted, other embodiments may include other types of databases or other data processing systems.

The remote computing device 106 (e.g., a user device such as a laptop computer) comprises one or more computing machines (e.g., a user device such as a laptop computer) that execute a remote software component 108 (e.g., browser accessed cloud service) to provide additional functionality to users of the network-based database system 102. The remote software component 108 comprises a set of machine-readable instructions (e.g., code) that, when executed by the remote computing device 106, cause the remote computing device 106 to provide certain functionality. The remote software component 108 may operate on input data and generate result data based on processing, analyzing, or otherwise transforming the input data. As an example, the remote software component 108 can be a data provider or data consumer that enables database tracking procedures, such as streams on shared tables and views, as discussed in further detail below.

The network-based database system 102 comprises an access management system 110, a compute service manager 112, an execution platform 114, and a database 116. The access management system 110 enables administrative users to manage access to resources and services provided by the network-based database system 102. Administrative users can create and manage users, roles, and groups, and use permissions to allow or deny access to resources and services. The access management system 110 can store shared data that securely manages shared access to the storage resources of the cloud computing storage platform 104 amongst different users of the network-based data warehouse system 102, as discussed in further detail below.

The compute service manager 112 coordinates and manages operations of the network-based database system 102. The compute service manager 112 also performs query optimization and compilation as well as managing clusters of computing services that provide compute resources (e.g., virtual warehouses, virtual machines, EC2 clusters). The compute service manager 112 can support any number of client accounts such as end users providing data storage and retrieval requests, system administrators managing the systems and methods described herein, and other components/devices that interact with compute service manager 112.

The compute service manager 112 is also coupled to database 116, which is associated with the entirety of data stored on the shared data processing platform 100. The database 116 stores data pertaining to various functions and aspects associated with the network-based database system 102 and its users.

In some embodiments, database 116 includes a summary of data stored in remote data storage systems as well as data available from one or more local caches. Additionally, database 116 may include information regarding how data is organized in the remote data storage systems and the local caches. Database 116 allows systems and services to determine whether a piece of data needs to be accessed without loading or accessing the actual data from a storage device. The compute service manager 112 is further coupled to an execution platform 114, which provides multiple computing resources (e.g., virtual warehouses) that execute various data storage and data retrieval tasks, as discussed in greater detail below.

Execution platform 114 is coupled to multiple data storage devices 124-1 to 124-N that are part of a cloud computing storage platform 104. In some embodiments, data storage devices 124-1 to 124-N are cloud-based storage devices located in one or more geographic locations. For example, data storage devices 124-1 to 124-N may be part of a public cloud infrastructure or a private cloud infrastructure. Data storage devices 124-1 to 124-N may be hard disk drives (HDDs), solid state drives (SSDs), storage clusters, Amazon S3 storage systems or any other data storage technology. Additionally, cloud computing storage platform 104 may include distributed file systems (such as Hadoop Distributed File Systems (HDFS)), object storage systems, and the like.

The execution platform 114 comprises a plurality of compute nodes (e.g., virtual warehouses). A set of processes on a compute node executes a query plan compiled by the compute service manager 112. The set of processes can include: a first process to execute the query plan; a second process to monitor and delete micro-partition files using a least recently used (LRU) policy, and implement an out of memory (OOM) error mitigation process; a third process that extracts health information from process logs and status information to send back to the compute service manager 112; a fourth process to establish communication with the compute service manager 112 after a system boot; and a fifth process to handle all communication with a compute cluster for a given job provided by the compute service manager 112 and to communicate information back to the compute service manager 112 and other compute nodes of the execution platform 114.

The cloud computing storage platform 104 also comprises an access management system 118 and a web proxy 120. As with the access management system 110, the access management system 118 allows users to create and manage users, roles, and groups, and use permissions to allow or deny access to cloud services and resources. The access management system 110 of the network-based database system 102 and the access management system 118 of the cloud computing storage platform 104 can communicate and share information so as to enable access and management of resources and services shared by users of both the network-based database system 102 and the cloud computing storage platform 104. The web proxy 120 handles tasks involved in accepting and processing concurrent API calls, including traffic management, authorization and access control, monitoring, and API version management. The web proxy 120 provides HTTP proxy service for creating, publishing, maintaining, securing, and monitoring APIs (e.g., REST APIs).

In some embodiments, communication links between elements of the shared data processing platform 100 are implemented via one or more data communication networks. These data communication networks may utilize any communication protocol and any type of communication medium. In some embodiments, the data communication networks are a combination of two or more data communication networks (or sub-Networks) coupled to one another. In alternative embodiments, these communication links are implemented using any type of communication medium and any communication protocol.

As shown in FIG. 1, data storage devices 124-1 to 124-N are decoupled from the computing resources associated with the execution platform 114. That is, new virtual warehouses can be created and terminated in the execution platform 114 and additional data storage devices can be created and terminated on the cloud computing storage platform 104 in an independent manner. This architecture supports dynamic changes to the network-based database system 102 based on the changing data storage/retrieval needs as well as the changing needs of the users and systems accessing the shared data processing platform 100. The support of dynamic changes allows network-based data warehouse system 102 to scale quickly in response to changing demands on the systems and components within network-based database system 102. The decoupling of the computing resources from the data storage devices 124-1 to 124-N supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other users' systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

Compute service manager 112, database 116, execution platform 114, cloud computing storage platform 104, and remote computing device 106 are shown in FIG. 1 as individual components. However, each of compute service manager 112, database 116, execution platform 114, cloud computing storage platform 104, and remote computing environment may be implemented as a distributed system (e.g., distributed across multiple systems/platforms at multiple geographic locations) connected by APIs and access information (e.g., tokens, login data). Additionally, each of compute service manager 112, database 116, execution platform 114, and cloud computing storage platform 104 can be scaled up or down (independently of one another) depending on changes to the requests received and the changing needs of shared data processing platform 100. Thus, in the described embodiments, the network-based database system 102 is dynamic and supports regular changes to meet the current data processing needs.

During typical operation, the network-based database system 102 processes multiple jobs (e.g., queries) determined by the compute service manager 112. These jobs are scheduled and managed by the compute service manager 112 to determine when and how to execute the job. For example, the compute service manager 112 may divide the job into multiple discrete tasks and may determine what data is needed to execute each of the multiple discrete tasks. The compute service manager 112 may assign each of the multiple discrete tasks to one or more nodes of the execution platform 114 to process the task. The compute service manager 112 may determine what data is needed to process a task and further determine which nodes within the execution platform 114 are best suited to process the task. Some nodes may have already cached the data needed to process the task (due to the nodes having recently downloaded the data from the cloud computing storage platform 104 for a previous job) and, therefore, be a good candidate for processing the task. Metadata stored in the database 116 assists the compute service manager 112 in determining which nodes in the execution platform 114 have already cached at least a portion of the data needed to process the task. One or more nodes in the execution platform 114 process the task using data cached by the nodes and, if necessary, data retrieved from the cloud computing storage platform 104. It is desirable to retrieve as much data as possible from caches within the execution platform 114 because the retrieval speed is typically much faster than retrieving data from the cloud computing storage platform 104.

As shown in FIG. 1, the shared data processing platform 100 separates the execution platform 114 from the cloud computing storage platform 104. In this arrangement, the processing resources and cache resources in the execution platform 114 operate independently of the data storage devices 124-1 to 124-N in the cloud computing storage platform 104. Thus, the computing resources and cache resources are not restricted to specific data storage devices 124-1 to 124-N. Instead, all computing resources and all cache resources may retrieve data from, and store data to, any of the data storage resources in the cloud computing storage platform 104.

Figure 2:
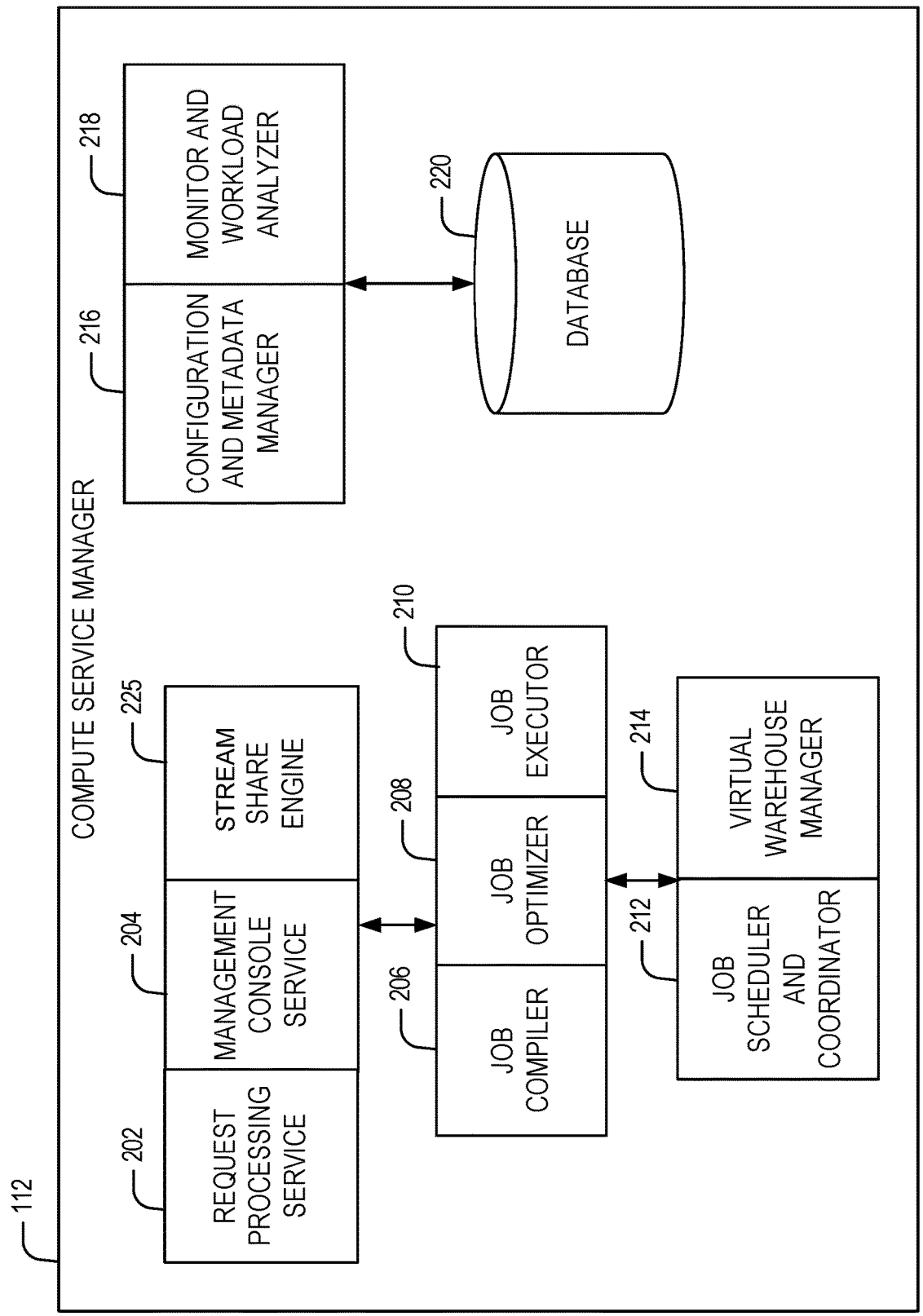
FIG. 2 is a block diagram illustrating components of a compute service manager, according to some example embodiments.

FIG. 2 is a block diagram illustrating components of the compute service manager 112, in accordance with some embodiments of the present disclosure. As shown in FIG. 2, a request processing service 202 manages received data storage requests and data retrieval requests (e.g., jobs to be performed on database data). For example, the request processing service 202 may determine the data necessary to process a received query (e.g., a data storage request or data retrieval request). The data may be stored in a cache within the execution platform 114 or in a data storage device in cloud computing storage platform 104. A management console service 204 supports access to various systems and processes by administrators and other system managers. Additionally, the management console service 204 may receive a request to execute a job and monitor the workload on the system. The stream share engine 225 manages change tracking on database objects, such as a data share (e.g., shared table) or shared view, according to some example embodiments, and as discussed in further detail below.

The compute service manager 112 also includes a job compiler 206, a job optimizer 208, and a job executor 210. The job compiler 206 parses a job into multiple discrete tasks and generates the execution code for each of the multiple discrete tasks. The job optimizer 208 determines the best method to execute the multiple discrete tasks based on the data that needs to be processed. The job optimizer 208 also handles various data pruning operations and other data optimization techniques to improve the speed and efficiency of executing the job. The job executor 210 executes the execution code for jobs received from a queue or determined by the compute service manager 112.

A job scheduler and coordinator 212 sends received jobs to the appropriate services or systems for compilation, optimization, and dispatch to the execution platform 114. For example, jobs may be prioritized and processed in that prioritized order. In an embodiment, the job scheduler and coordinator 212 determines a priority for internal jobs that are scheduled by the compute service manager 112 with other "outside" jobs such as user queries that may be scheduled by other systems in the database but may utilize the same processing resources in the execution platform 114. In some embodiments, the job scheduler and coordinator 212 identifies or assigns particular nodes in the execution platform 114 to process particular tasks. A virtual warehouse manager 214 manages the operation of multiple virtual warehouses implemented in the execution platform 114. As discussed below, each virtual warehouse includes multiple execution nodes that each include a cache and a processor (e.g., a virtual machine, an operating system level container execution environment).

Additionally, the compute service manager 112 includes a configuration and metadata manager 216, which manages the information related to the data stored in the remote data storage devices and in the local caches (i.e., the caches in execution platform 114). The configuration and metadata manager 216 uses the metadata to determine which data micro-partitions need to be accessed to retrieve data for processing a particular task or job. A monitor and workload analyzer 218 oversees processes performed by the compute service manager 112 and manages the distribution of tasks (e.g., workload) across the virtual warehouses and execution nodes in the execution platform 114. The monitor and workload analyzer 218 also redistributes tasks, as needed, based on changing workloads throughout the network-based database system 102 and may further redistribute tasks based on a user (e.g., "external") query workload that may also be processed by the execution platform 114. The configuration and metadata manager 216 and the monitor and workload analyzer 218 are coupled to a data storage device 220. Data storage device 220 in FIG. 2 represent any data storage device within the network-based database system 102. For example, data storage device 220 may represent caches in execution platform 114, storage devices in cloud computing storage platform 104, or any other storage device.

Figure 3:
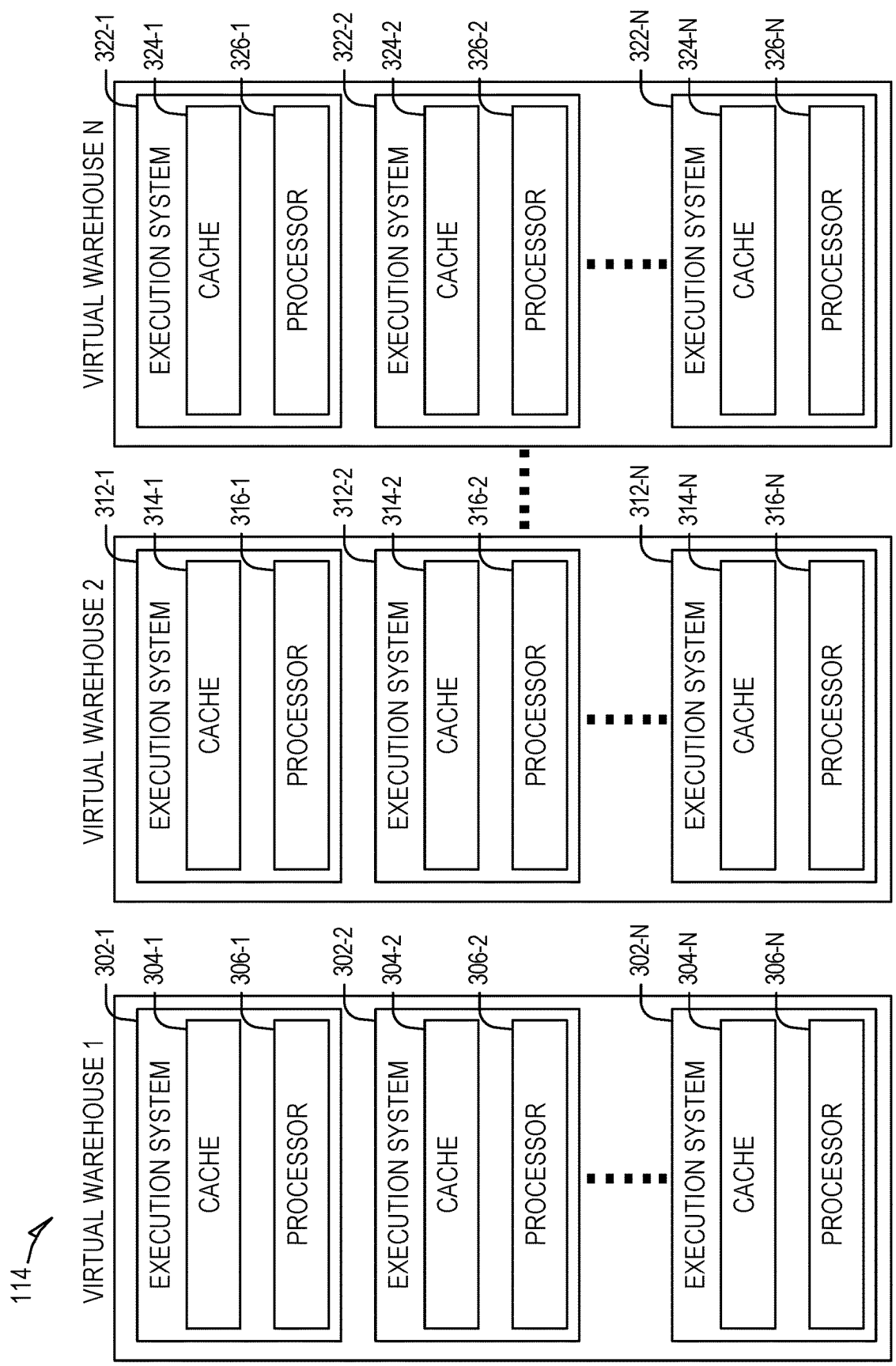
FIG. 3 is a block diagram illustrating components of an execution platform, according to some example embodiments.

FIG. 3 is a block diagram illustrating components of the execution platform 114, in accordance with some embodiments of the present disclosure. As shown in FIG. 3, execution platform 114 includes multiple virtual warehouses, which are elastic clusters of compute instances, such as virtual machines. In the example illustrated, the virtual warehouses include virtual w, virtual w, and virtual warehouse n. Each virtual warehouse (e.g., EC2 cluster) includes multiple execution nodes (e.g., virtual machines) that each include a data cache and a processor. The virtual warehouses can execute multiple tasks in parallel by using the multiple execution nodes. As discussed herein, execution platform 114 can add new virtual warehouses and drop existing virtual warehouses in real time based on the current processing needs of the systems and users. This flexibility allows the execution platform 114 to quickly deploy large amounts of computing resources when needed without being forced to continue paying for those computing resources when they are no longer needed. All virtual warehouses can access data from any data storage device (e.g., any storage device in cloud computing storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary (e.g., upon a query or job completion).

Each virtual warehouse is capable of accessing any of the data storage devices 124-1 to 124-N shown in FIG. 1. Thus, the virtual warehouses are not necessarily assigned to a specific data storage device 124-1 to 124-N and, instead, can access data from any of the data storage devices 124-1 to 124-N within the cloud computing storage platform 104. Similarly, each of the execution nodes shown in FIG. 3 can access data from any of the data storage devices 124-1 to 124-N. For instance, the storage device 124-1 of a first user (e.g., provider account user) may be shared with a worker node in a virtual warehouse of another user (e.g., consumer account user), such that the other user can create a database (e.g., read-only database) and use the data in storage device 124-1 directly without needing to copy the data (e.g., copy it to a new disk managed by the consumer account user). In some embodiments, a particular virtual warehouse or a particular execution node may be temporarily assigned to a specific data storage device, but the virtual warehouse or execution node may later access data from any other data storage device.

In the example of FIG. 3, virtual w includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual w discussed above, virtual w includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual w includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data the execution nodes are caching. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each include one data cache and one processor, alternative embodiments may include execution nodes containing any number of processors and any number of caches. Additionally, the caches may vary in size among the different execution nodes. The caches shown in FIG. 3 store, in the local execution node (e.g., local disk), data that was retrieved from one or more data storage devices in cloud computing storage platform 104 (e.g., S3 objects recently accessed by the given node). In some example embodiments, the cache stores file headers and individual columns of files as a query downloads only columns necessary for that query.

To improve cache hits and avoid overlapping redundant data stored in the node caches, the job optimizer 208 assigns input file sets to the nodes using a consistent hashing scheme to hash over table file names of the data accessed (e.g., data in database 116 or database 122). Subsequent or concurrent queries accessing the same table file will therefore be performed on the same node, according to some example embodiments.

As discussed, the nodes and virtual warehouses may change dynamically in response to environmental conditions (e.g., disaster scenarios), hardware/software issues (e.g., malfunctions), or administrative changes (e.g., changing from a large cluster to smaller cluster to lower costs). In some example embodiments, when the set of nodes changes, no data is reshuffled immediately. Instead, the least recently used replacement policy is implemented to eventually replace the lost cache contents over multiple jobs. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud computing storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the execution platform 114 implements skew handling to distribute work amongst the cache resources and computing resources associated with a particular execution, where the distribution may be further based on the expected tasks to be performed by the execution nodes. For example, an execution node may be assigned more processing resources if the tasks performed by the execution node become more processor-intensive. Similarly, an execution node may be assigned more cache resources if the tasks performed by the execution node require a larger cache capacity. Further, some nodes may be executing much slower than others due to various issues (e.g., virtualization issues, network overhead). In some example embodiments, the imbalances are addressed at the scan level using a file stealing scheme. In particular, whenever a node process completes scanning its set of input files, it requests additional files from other nodes. If the one of the other nodes receives such a request, the node analyzes its own set (e.g., how many files are left in the input file set when the request is received), and then transfers ownership of one or more of the remaining files for the duration of the current job (e.g., query). The requesting node (e.g., the file stealing node) then receives the data (e.g., header data) and downloads the files from the cloud computing storage platform 104 (e.g., from data storage device 124-1), and does not download the files from the transferring node. In this way, lagging nodes can transfer files via file stealing in a way that does not worsen the load on the lagging nodes.

Although virtual warehouses 1, 2, and n are associated with the same execution platform 114, the virtual warehouses may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 114 is also fault tolerant. For example, if one virtual warehouse fails, that virtual warehouse is quickly replaced with a different virtual warehouse at a different geographic location.

A particular execution platform 114 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in cloud computing storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

Data in a table may automatically be divided into an immutable storage device referred to as a micro-partition. A micro-partition may be an immutable storage device in a database table that cannot be updated in-place and must be regenerated when the data stored therein is modified. A micro-partition may be considered a batch unit where each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allow for extremely granular selection of the micro-partitions to be scanned, which can be comprised of millions, or even hundreds of millions, of micro-partitions. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure.

Typically, metadata can be added to rows in micro-partitions when the row is updated or inserted. For example, metadata columns for indicating the partition name (META-DATA$ORIGINAL PARTITION NAME) and the row number (METADATA$ORIGINAL PARTITION ROW NUMBER) can track the partition that the row first originated in. By using this information and taking a set of partitions that were added or removed from the database system between two points in time, the database system can determine a superset of the rows that were added, deleted, or updated during that period. This information can be displayed as a stream or virtual table.

However, to filter out rows that did not change between two points in time, the database system may have to perform a logical full outer join on a set of partitions added to the database system and a set of partitions removed from the system between those two points in time. This outer join operation can be time consuming and expensive, which can result in increased query costs.

Therefore, as described in further detail below, to accelerate stream generation (or change-data-capture (CDC)), row bitsets can be used to track changes in a database and the bitsets can then be used for stream generation. For example, three distinct row bitsets may be added to mark deleted, updated, and inserted rows in micro-partitions. That is, one row bitset can mark deleted rows in a micro-partition, one row bitset can mark old versions of updated rows in the micro-partition, and one row bitset can mark inserted rows and new versions of updated rows in the micro-partition.

These row bitsets may be generated during DML operations, such as INSERT, UPDATE, DELETE, MERGE, etc. Different DML operations can be represented by using a combination of the three bitsets for deleted, updated, and inserted. For example, a merge command may be represented by updating each of the deleted and updated row bitsets for the corresponding rows in the existing micro-partition, and inserted row bitsets for the appropriate rows in the new micro-partition.

Figure 4:
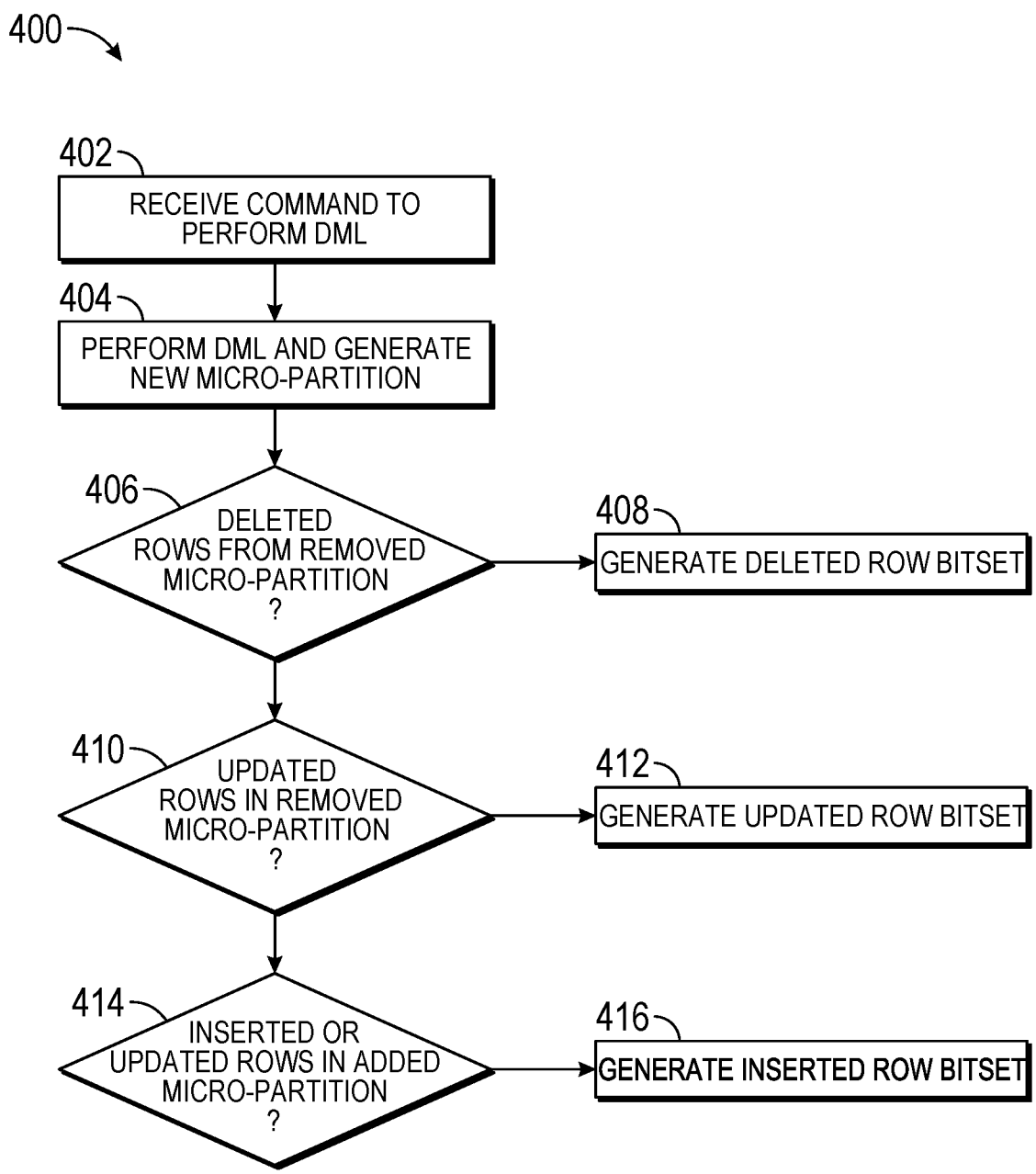
FIG. 4 illustrates a flow diagram for a method for generating row bitsets, according to some example embodiments.

FIG. 4 illustrates a flow diagram for a method 400 for generating row bitsets, according to some example embodiments. At operation 402, a database system may receive a command to perform a DML operation on a table. At operation 404, the database system may perform the DML operation and, in doing so, may create one or more new micro-partitions in the table and may remove one or more micro-partitions, as described above.

At operation 406, the database system may check if performing the DML operation resulted in any deleted rows. If the DML operation deleted rows, a deleted row bitset for the removed micro-partition may be generated to reflect the deleting of the row(s) at operation 408. That is, at DML time, the database system may generate a bit vector for a partition with 1 bit for indicating deleted rows. For instance, a deleted row bitset may be a vector of [1,0,0] for the partition indicating that the row with index of 1 has been deleted.

At operation 410, the database system may check if performing the DML operation resulted in any updated rows. If the DML operation resulted in updating any rows, the updated row bitset for the removed micro-partition may be generated to mark all updated rows at operation 412. That is, at DML time, the database system may generate a bit vector with 1 bit for indicating updated rows. For instance, an updated row bitset may be a vector of [0,1,0] for the partition indicating that the row with index of 2 has been updated.

At operation 414, the database system may check if performing the DML operation resulted in any inserted or updated rows. If the DML operation resulted in inserting or updating any rows, the inserted row bitset for the new micro-partition may be generated to reflect the new rows or new versions of rows at operation 416. That is, at DML time, the database system may generate a bit vector with 1 bit for indicating inserted rows. For instance, an inserted row bitset may include a vector of [0,0,1] for the partition indicating that the row with index of 3 has been inserted as a new row or new version of an updated row. Hence, with respect to a DML operation, one deleted and one updated row bitset may be generated per removed micro-partition, and one inserted row bitset may be generated per added micro-partition.

As mentioned above, a DML operation can result in a plurality of row bitsets being generated to fully represent the DML operation. For example, a merge operation may result in deletion of one or more rows, insertion of another row with the merged data, which is also updated. Thus, bitsets for deleted, inserted, and updated rows may all be generated to represent the merge operation and changes to the appropriate rows.

In some embodiments, deleted and updated row bitsets may be generated in an execution platform (XP) (e.g., execution platform 114 which comprises a plurality of compute nodes described above) in the scanback RSO (Row Set Operator) during update, delete, or merge DMLs. The generation may be plugged into the logic that maps rows from the input rowset (rows to be deleted or updated) against the rows from the scanned back partition.

In some embodiments, inserted row bitsets (i.e., bitsets that mark inserted rows and new versions of updated rows) may be generated in an XP in the Insert RSO during insert, update, merge, and copy DMLs. The insert RSO may distinguish between existing rows (copy-on-write) and newly added data (inserted or new versions of updated rows). For example, a Union All operator may precede the insert operator, collecting rows from sub-plans that produce copied-on-write rows and new rows.

In some embodiments, the bitsets may have the following layout:

[1,0,0,1, . . . ]

A "1" indicates that the row has been updated, deleted, or inserted (depending on the bitset type), and a "0" indicates that the row was unchanged. For each bitset, there are as many entries in the bitset as there are rows in its corresponding partition. Other layouts may also be used to reduce storage and compute costs. Checks may be added when these bitsets are used as selection vectors to ensure that the bitset length and row count are equal.

Figure 5:
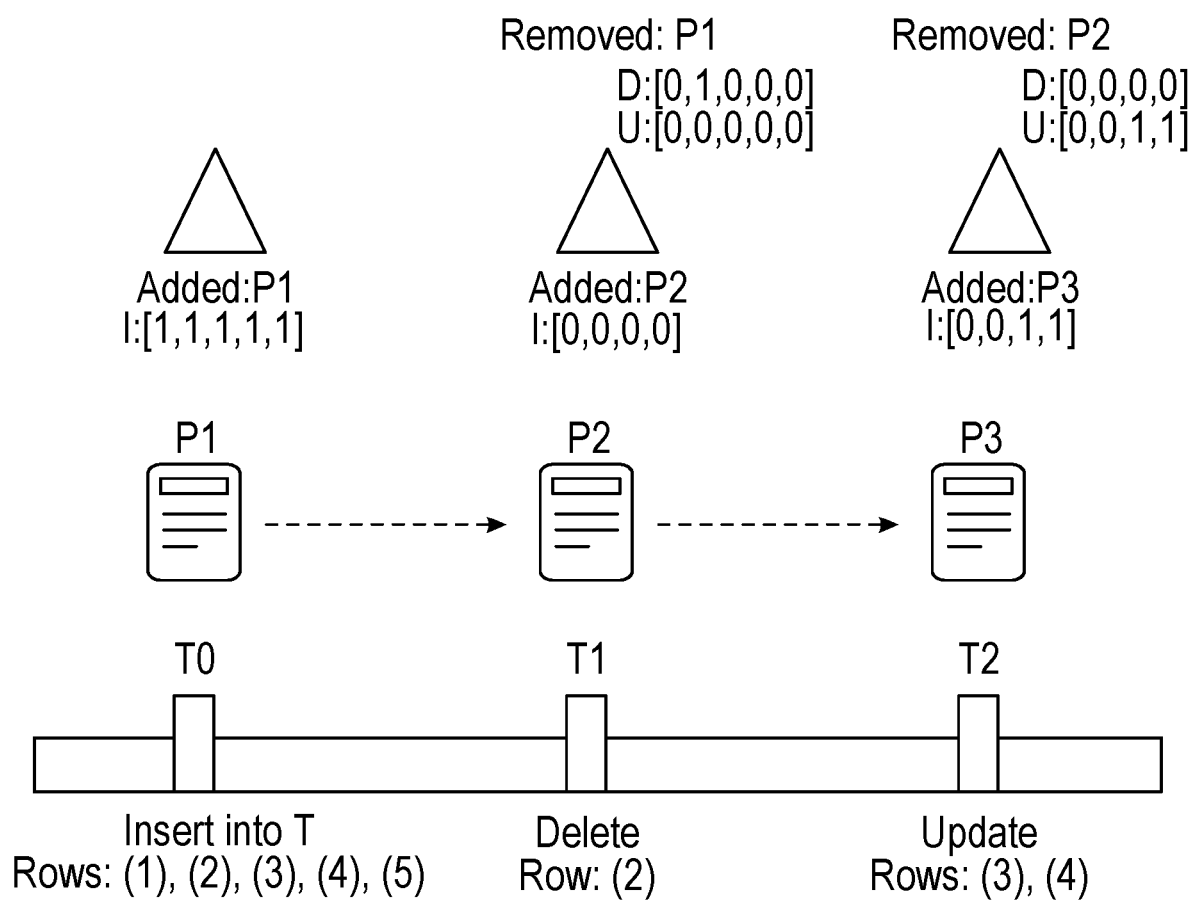
FIG. 5 illustrates a timing diagram illustrating generation of row bitsets, according to some example embodiments.

FIG. 5 illustrates a timing diagram illustrating generation of row bitsets, according to some example embodiments. For example, an XP may generate the row bitsets as described above.

At time T0, a command to insert into table T rows 1-5 is performed. In response, partition P1 is created and added to the table T. The inserted row bitset is generated to show the insertion of rows 1-5 having "1" for row positions 1-5.

At time T1, a command to delete row 2 from table T is performed. In response, new partition P2 is created and added to reflect this new change and partition P1 is removed. The row bitsets are also generated to reflect the changes made to table T with the addition of partition P2 and removal of partition P1 at time T1. For example, deleted and updated row bitsets are generated with reference to partition P1, which is removed, and the inserted row bitset is generated with reference to added partition P2. The deleted row bitset is generated to show the deletion of row 2 from table T by having a "1" for row position 2 and "0" for all other row positions. The updated row bitset shows "0" for all row values. The inserted row bitset shows "0" for all row values because no rows were inserted. Moreover, because of the row deletion, table T includes 4 rows in partition P2 as compared to 5 rows in partition P1; hence there are four values in the inserted bitset, which refers to added partition P2 while the deleted and updated bitsets have five values because the deleted and updated bitsets refer to now-removed partition P1.

At time T2, a command to update rows 3 and 4 in table T is performed. In response, a new partition P3 is created and added to reflect this change and partition P2 is removed. The updated row bitset is generated to show the updates of rows 3 and 4 by having "1" for row positions 3 and 4 (table T now only has 4 rows because of the deletion of a row at T1) and "0" for all other row positions. Moreover, because the update operation is effectuated by generating new rows 3 and 4, the inserted row bitset has "1" for row positions 3 and 4 and "0" for all other row positions. As described in further detail below, the database system may use the update and insert row bitsets to distinguish between brand new rows in a table and rows that were inserted responsive to an update command. The deleted row bitset shows "0" for all row values because no rows were deleted. The XP may generate row bitsets and then may flow them up to a global service (GS) (also called a compute service manager 112 described above). The GS may then add the bitsets to delta expression properties (EP) files corresponding to the table and persist them there. That is, the generated row bitsets of each micro-partition may be stored as metadata for the table, i.e., stored as part of the EP files for the table. Expression properties of a table may include two types of files: delta EP files and compacted EP files. Delta EP files may track changes between table versions. The row bitsets may be stored as part of the delta EP files. A delta EP file records the partitions that have been added or removed from a table. For example, the delta EP file stores a deleted and an updated row bitset for each removed partition, and stores an inserted row bitset for each added partition. Compacted EP files may be periodically generated when multiple delta EP files are combined and may represent one point in time.

The bitsets may be stored in a format that is compressible and provides good performance when performing logical OR operations on the XP side. That is, the format may allow using these bitsets as selection vectors after compression without having to explicitly decompress them. In some embodiments, versioning techniques may be added to the bitsets. For example, a version identifier may be added as a first byte. In some embodiments, a byte layout may be represented as: [[VERSION-BYTE][FIRST_SEQ_VAL-NSEQ_LENS] ], where FIRST_SEQ_VAL specifies the value of the first bit and SEQ_LENS is a list of sequence length values encoding the bitset with run-length encoding (RLE). A sequence length encodes the length of a sequence of bits of the same value (either 0 or 1). The sequence lengths in SEQ_LENS alternatingly encode sequences of 0 and 1 bits where FIRST_SEQ_VAL defines the values of the first sequence's bits.

In some embodiments, the scanback RSO may send deleted and updated bitsets via a file unregister request to GS. For each file unregistration request, the GS may add the deleted and updated bitsets along with a global file reference that references the removed data file. In some embodiments, the insert RSO may send the inserted bitset to the GS via a register file request. GS may add the inserted bitset along with the information about the added data file.

In the delta EP file, custom block sections for the row bitsets may be created to store and persist the bitsets: DELETED_BITSET_BLOCK; UPDATED_BITSET_BLOCK; INSERTED_BITSET_BLOCK. Each block may contain a list of bitsets. In some embodiments, the deleted bitset block and updated bitset block may reference the unregistered partition that they belong to by position in a deleted global file reference list. The bitsets in the inserted bitset block may reference their corresponding registered partition by position in a registered file list.

A bitset custom block may start with N, the number of entries in the block. Then there are N entries, one entry for an unregistered partition in case of updated/deleted bitsets or for every registered partition in case of inserted bitsets. Each entry may start with "LEN", which is the size in bytes of the entry.

As described above, the rowset bitsets may be generated by XPs during the execution of DMLs and then flowed up to the GS, which will then store them in delta EP files. The stored row bitset data can then be used in different applications. For example, the database system can perform change tracking at a per-row basis as opposed to a per-partition basis. Stream reads, as described in further detail below, can be performed with significantly less computation cost and thus take significantly less time to compute. Row bitsets, as described herein, can be used to compute all changes between two points in time. Moreover, row bitsets can enable less costly delete and stream replications.

Row bitsets can accelerate stream reads by reducing the number of rows scanned to only rows that were inserted, updated, or deleted as part of DML operations. Row bitsets allow the database system to identify deleted rows, inserted rows, and previous and new versions of updated rows without the need to perform outer join operations of removed partitions and added partitions, as described above. Instead, the database system can derive changes (inserts, updates, deletes) on a table by scanning and filtering added and removed partitions using the bitsets.

At a high level, the full outer join can be replaced by two table scan operators. The first scan operator receives a scanset from the GS that includes the delta EP files for all versions during the change interval (i.e., the period between two points in time). The first scan operator reads the file information of all added and removed partitions and the bitsets that correspond to these partitions. For each partition, the file information and bitset(s) are sent to an operator that constructs a scanset of that information. A second scan operator iterates over the scanset. For each partition, it constructs a selection vector of the partition's row bitsets and scans the partition's data file using the selection vector. If a partition was removed during the changes interval, that partition's deleted and updated bitsets are included in the selection vector. And if a partition was first added and later deleted during the changes interval, all three bitsets are included in the selection vector.

Figure 6:
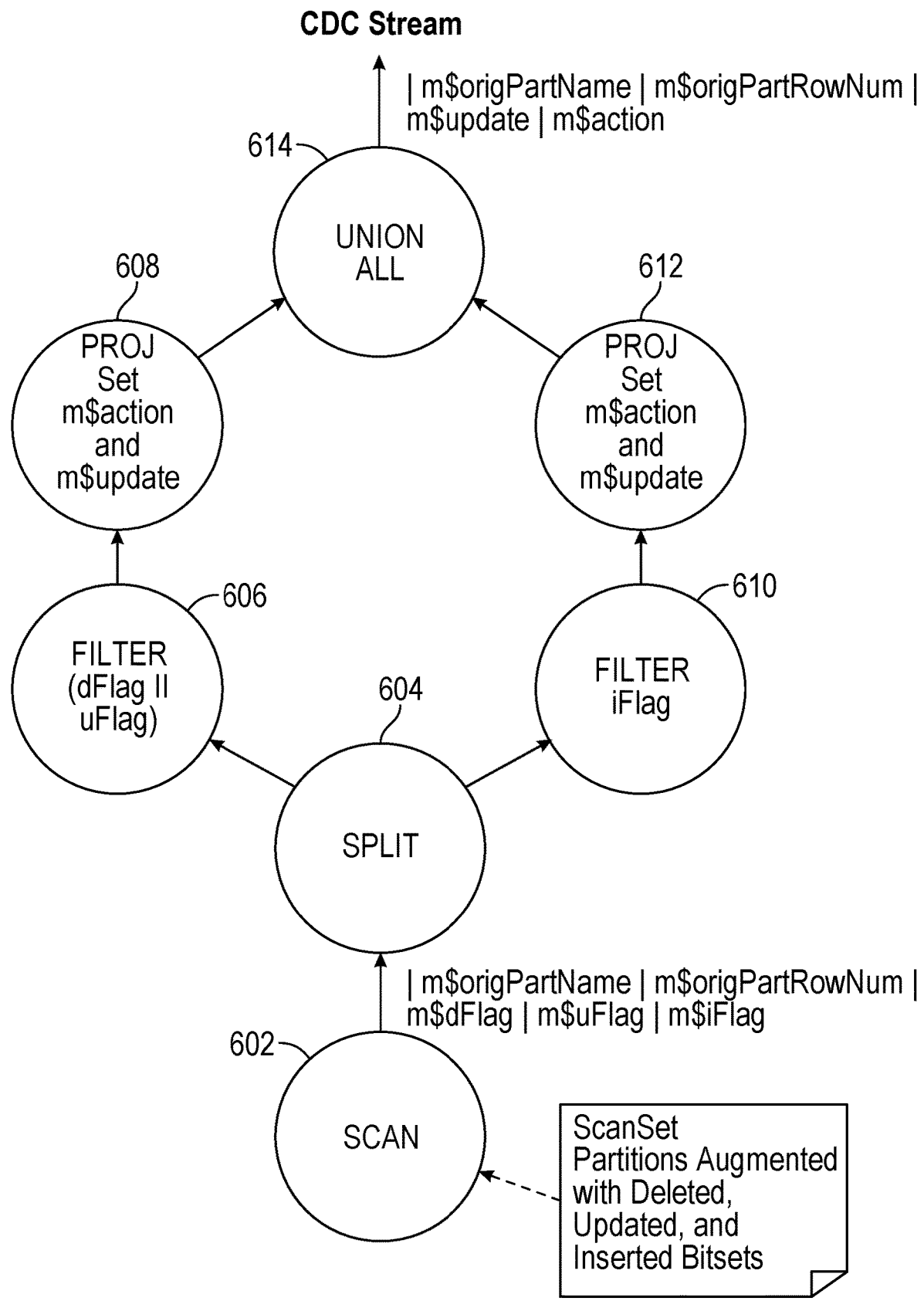
FIG. 6 illustrates a flow diagram of a method to generate a stream using row bitsets, according to some example embodiments.

FIG. 6 illustrates a flow diagram of a method 600 to generate a stream using row bitsets, according to some example embodiments. At 602, a table scan operator may be performed. However, the full table may not need to be scanned but only those partitions that were added and removed during the change interval. Moreover, the operator uses the bitsets to only produce those rows that were inserted, deleted, or updated. That is, only rows in the partitions added or removed in the changes interval that have been inserted, deleted, and/or updated are scanned, thus reducing the number of produced rows significantly.

For example, the scan operator may have a Boolean configuration parameter that enables bitscan scanning. When the bitset scanning is enabled, the operator produces rows with the original table schema and five additional metadata columns: m$origPartName, m$origPartRowNum, m$dFlag, m$uFlag, and m$iFlag. The M$origPartName and m$origPartRowNum columns represent original partition name and original row number, and are maintained by change tracking. The m$dFlag, m$uFlag, and m$iFlag are flag columns corresponding to the deleted, updated, and inserted row bitsets, respectively. These flags are Boolean columns. For each row, the values of the flag columns are set to true if the row was marked by the respective bitset. Hence, the scan operator may scan only rows with at least one flag column set as true.

When bitscan scanning is enabled, the scan operator expects a scanset that includes for each partition to scan one or more bitsets. Before starting to read a partition, the operator retrieves the bitsets that are referenced by the scanset. It combines them with a position-wise "OR" and generates a selection vector. The scan operator then starts to read the partition using the selection vector. For each selected row, the flag columns are set by checking the individual bitsets. In some embodiments, combining the bitsets into a single selection vector can speed up the table scan for partitions with a few point deletes/updates/inserts as complete rowsets could be skipped.

At operation 604, a split operator may duplicate rows emitted by the scan operator. The duplicated rows may be identical to each other thus creating two branches of the rows emitted by the scan operator. A first branch (left branch) processes rows that were deleted or updated by filtering rows with true m$dFlag and m$uFlag values at operation 606. At operation 608, the first branch using a projection operator may set an action attribute (m$action) for each row to delete and may set an update attribute (m$update) depending on the m$updateFlag for the respective row.

The second branch (right branch) processes rows that were inserted by filtering rows with true m$iFlag values at operation 610. At operation 612, the second branch using a projection operator may set an action attribute (m$action) for each to insert and may set the update attribute (m$update) based on the m$origPartName metadata column value. Newly inserted rows do not have original partition information; therefore, the update attribute for the respective row may be set when m$origPartName is not null.

At operation 614, a union all operator may be performed to combine both branches. The splitting, projecting in each branch, and then unioning ensures that rows, which were inserted, possibly updated zero, one or more times and later deleted within the changes interval are represented by multiple rows that correspond to the applied changes such that those interim changes are not lost. Hence, the result of the union all operator is a CDC stream including all changes that were applied on the table within the changes interval.

In some embodiments, the CDC stream may be then converted to a delta stream showing the minimum set of changes to the table in the changes interval, i.e., a result set that has no redundant changes. For example, if a row is updated twice during a change interval, only the most recent change will be shown in the delta stream. The conversion from a CDC stream to a delta stream may be done based on the information in the multiple rows representing changes to a single row of the base table in the CDC stream.

FIG. 7 illustrates example portions of a simplified stream 700, according to some example embodiments. Stream 700 illustrates modifications to one row (row id A) during a change interval. The m$action column indicates the action performed on the respective row, e.g., delete or insert. The m$update column indicates whether the action was performed as part of an update. As described above, stream 700 is a CDC-stream. Here, stream 700 captures the insert of row A with value 1, the update of the row to value 2, and then the deletion of the row. This sequence is captured by four rows in stream 700. The first row of stream 700 represents the insert of row A with value 1. The next two rows of stream 700 represent the update indicated by "TRUE" under the m$update column: first row A with value 1 being deleted is represented by the second row in stream 700, and then row A being inserted with value 2 is represented by the third row in stream 700. The last row of stream 700 represents the deletion of row A with value 2.

Figure 8:
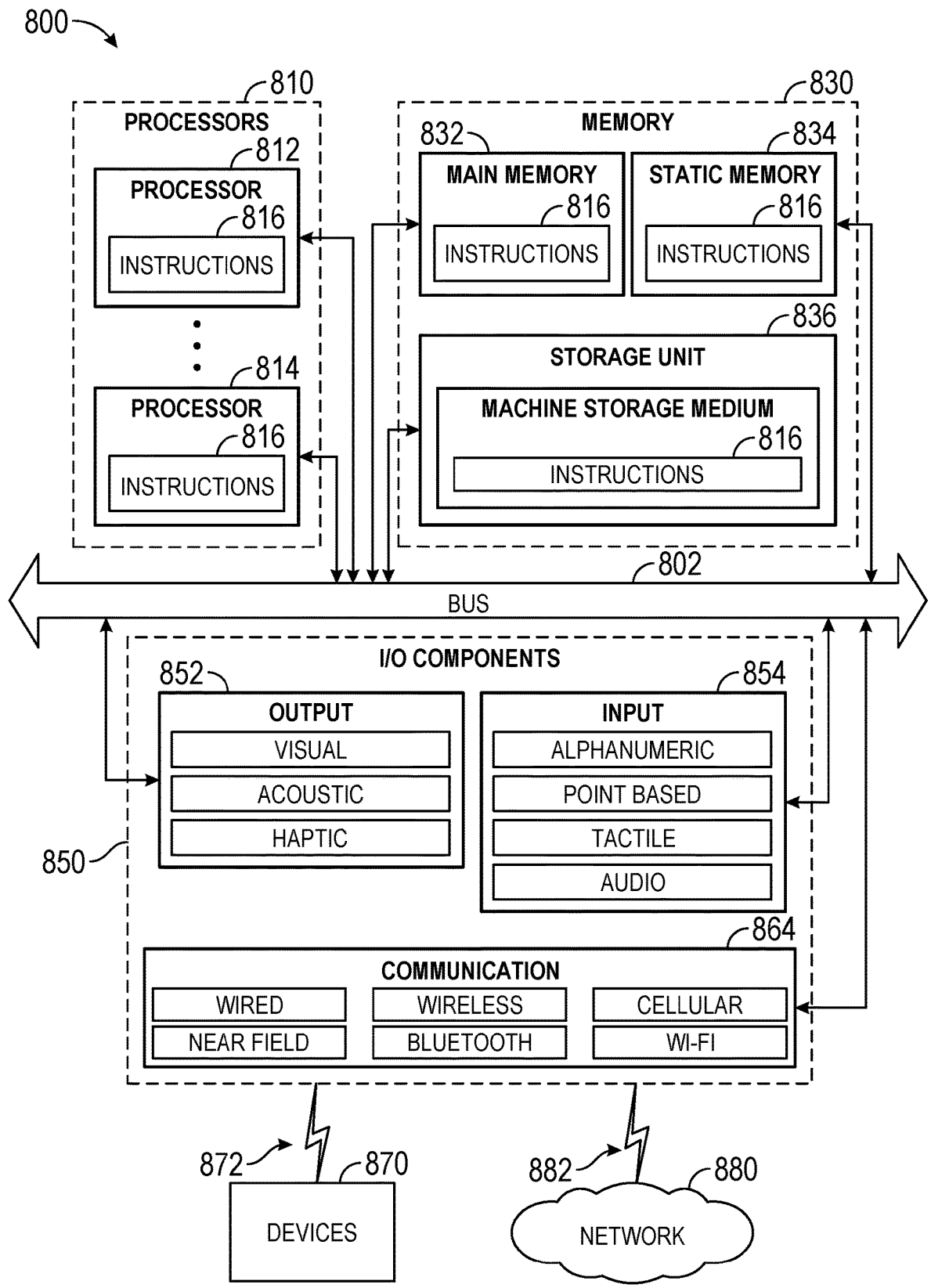
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine 800 in the form of a computer system within which a set of instructions may be executed for causing the machine 800 to perform any one or more of the methodologies discussed herein, according to an example embodiment. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions 816 may cause the machine 800 to execute any one or more operations of any one or more of the methods described herein. As another example, the instructions 816 may cause the machine 800 to implement portions of the data flows described herein. In this way, the instructions 816 transform a general, non-programmed machine into a particular machine 800 (e.g., the remote computing device 106, the access management system 118, the compute service manager 112, the execution platform 114, the access management system 118, the Web proxy 120, remote computing device 106) that is specially configured to carry out any one of the described and illustrated functions in the manner described herein.

In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 includes processors 810, memory 830, and input/output (I/O) components 850 configured to communicate with each other such as via a bus 802. In an example embodiment, the processors 810 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 812 and a processor 814 that may execute the instructions 816. The term "processor" is intended to include multi-core processors 810 that may comprise two or more independent processors (sometimes referred to as "cores") that may execute instructions 816 contemporaneously. Although FIG. 8 shows multiple processors 810, the machine 800 may include a single processor with a single core, a single processor with multiple cores (e.g., a multi-core processor), multiple processors with a single core, multiple processors with multiple cores, or any combination thereof.

The memory 830 may include a main memory 832, a static memory 834, and a storage unit 836, all accessible to the processors 810 such as via the bus 802. The main memory 832, the static memory 834, and the storage unit 836 store the instructions 816 embodying any one or more of the methodologies or functions described herein. The instructions 816 may also reside, completely or partially, within the main memory 832, within the static memory 834, within the storage unit 836, within at least one of the processors 810 (e.g., within the processor's cache memory), or any suitable combination thereof, during execution thereof by the machine 800.

The I/O components 850 include components to receive input, provide output, produce output, transmit information, exchange information, capture measurements, and so on. The specific I/O components 850 that are included in a particular machine 800 will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 854 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 850 may include communication components 864 operable to couple the machine 800 to a network 880 or devices 870 via a coupling 882 and a coupling 872, respectively. For example, the communication components 864 may include a network interface component or another suitable device to interface with the network 880. In further examples, the communication components 864 may include wired communication components, wireless communication components, cellular communication components, and other communication components to provide communication via other modalities. The devices 870 may be another machine or any of a wide variety of peripheral devices (e.g., a peripheral device coupled via a universal serial bus (USB)). For example, as noted above, the machine 800 may correspond to any one of the remote computing device 106, the access management system 118, the compute service manager 112, the execution platform 114, the Web proxy 120, and the devices 870 may include any other of these systems and devices.

The various memories (e.g., 830, 832, 834, and/or memory of the processor(s) 810 and/or the storage unit 836) may store one or more sets of instructions 816 and data structures (e.g., software) embodying or utilized by any one or more of the methodologies or functions described herein. These instructions 816, when executed by the processor(s) 810, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 880 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network, and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 816 for execution by the machine 800, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method comprising: performing one or more operations on a table including at least a first micro-partition; in response to performing the one or more operations, removing the first micro-partition and adding at least a second micro-partition; generating a plurality of row bitsets for the micro-partitions involved in the one or more operations, the row bitsets indicating rows modified by the one or more operations; based on the plurality of row bitsets, scanning a subset of rows in the table, the subset of rows marked as being modified by the row bitsets; and based on the scanned subset of rows, generating change data capture information showing changes made to the table in a specified time interval.

Example 2. The method of example 2, wherein the plurality of row bitsets include one inserted row bitset for marking newly inserted and new versions of updated rows, one deleted row bitset for marking newly deleted rows, and one updated row bitset for marking previous versions of updated rows.

Example 3. The method of any of examples 1-2, wherein the deleted and updated row bitsets are generated in a scanback row set operator (RSO) during an update, delete, or merge operation.

Example 4. The method of any of examples 1-3, wherein the inserted row bitsets are generated in an insert RSO during an insert, update, merge, or copy operation.

Example 5. The method of any of examples 1-4, further comprising: based on the scanning, generating rows from the table with a plurality of metadata columns, wherein a first metadata column indicates an original partition name for the respective row, wherein a second metadata column indicates an original row number for the respective row.

Example 6. The method of any of examples 1-5, wherein a third metadata column includes a deleted flag indicating whether the respective row was deleted based on the plurality of row bitsets, wherein a fourth metadata column includes an updated flag indicating whether the respective row was updated based on the plurality of row bitsets, and wherein a fifth metadata column includes an inserted flag indicating whether the respective row was inserted based on the plurality of row bitsets Example 7. The method of any of examples 1-6, further comprising: splitting the generated rows in two branches, wherein a first branch processes a first subset of rows that were deleted or updated based on the deleted and updated flags, and wherein a second branch processes a second subset of rows that were inserted based on the inserted flags.

Example 8. The method of any of examples 1-7, further comprising: in the first branch, setting an action attribute for each row in the first subset to delete and setting an update attribute for each row in the first subset based on the update flag.

Example 9. The method of any of examples 1-8, further comprising: in the second branch, setting the action attribute for each row in the second subset to insert and setting the update attribute for each row in the second subset based on the value of the original partition name for the respective row.

Example 10. The method of any of examples 1-9, further comprising: unioning results of the first and second branch to generate the change data capture information.

Example 11. A system comprising: one or more processors of a machine; and a memory storing instructions that, when executed by the one or more processors, cause the machine to perform operations implementing any one of example methods 1 to 10.

Example 12. A machine-readable storage device embodying instructions that, when executed by a machine, cause the machine to perform operations implementing any one of example methods 1 to 10.

What is claimed is:

1. A method comprising:
   performing one or more operations on a table including at least a first micro-partition;
   in response to performing the one or more operations, removing the first micro-partition and adding at least a second micro-partition;
   generating a plurality of row bitsets for the micro-partitions involved in the one or more operations, the row bitsets indicating rows modified by the one or more operations,
   wherein the plurality of row bitsets include one inserted row bitset for marking newly inserted and new versions of updated rows, one deleted row bitset for marking newly deleted rows, and one updated row bitset for marking previous versions of updated rows,
   wherein the deleted and updated row bitsets are generated in a scanback row set operator (RSO) during one or more update, delete, or merge operations,
   wherein the inserted row bitsets are generated in an insert RSO during one or more insert, update, merge, or copy operations;
   based on the plurality of row bitsets, scanning a subset of rows in the table, the subset of rows marked as being modified by the row bitsets;
   splitting the scanned subset of rows into a first subset and a second subset, the first subset including rows that were newly deleted or newly updated and the second subset including rows that were newly inserted;
   in a first branch, processing the first subset of rows;
   in a second branch, processing the second subset of rows;
   unioning results of processing the first and second branches to generate change data capture information showing changes made to the table in a specified time interval.

2. The method of claim 1, further comprising:
   based on the scanning, generating rows from the table with a plurality of metadata columns,
   wherein a first metadata column indicates an original partition name for the respective row,
   wherein a second metadata column indicates an original row number for the respective row.

3. The method of claim 2,
   wherein a third metadata column includes a deleted flag indicating whether the respective row was deleted based on the plurality of row bitsets,
   wherein a fourth metadata column includes an updated flag indicating whether the respective row was updated based on the plurality of row bitsets, and
   wherein a fifth metadata column includes an inserted flag indicating whether the respective row was inserted based on the plurality of row bitsets.

4. The method of claim 3,
   wherein the first branch processes the first subset of rows that were deleted or updated based on the deleted and updated flags, and
   wherein the second branch processes the second subset of rows that were inserted based on the inserted flags.

5. The method of claim 4, further comprising:
   in the first branch, setting an action attribute for each row in the first subset to delete and setting an update attribute for each row in the first subset based on the update flag.

6. The method of claim 5, further comprising:
   in the second branch, setting the action attribute for each row in the second subset to insert and setting the update attribute for each row in the second subset based on the value of the original partition name for the respective row.

7. A machine-storage medium embodying instructions that, when executed by a machine, cause the machine to perform actions comprising:
   performing one or more operations on a table including at least a first micro-partition;
   in response to performing the one or more operations, removing the first micro-partition and adding at least a second micro-partition;
   generating a plurality of row bitsets for the micro-partitions involved in the one or more operations, the row bitsets indicating rows modified by the one or more operations,
   wherein the plurality of row bitsets include one inserted row bitset for marking newly inserted and new versions of updated rows, one deleted row bitset for marking newly deleted rows, and one updated row bitset for marking previous versions of updated rows,
   wherein the deleted and updated row bitsets are generated in a scanback row set operator (RSO) during one or more update, delete, or merge operations,
   wherein the inserted row bitsets are generated in an insert RSO during one or more insert, update, merge, or copy operations;
   based on the plurality of row bitsets, scanning a subset of rows in the table, the subset of rows marked as being modified by the row bitsets;
   splitting the scanned subset of rows into a first subset and a second subset, the first subset including rows that were newly deleted or newly updated and the second subset including rows that were newly inserted;
   in a first branch, processing the first subset of rows;
   in a second branch, processing the second subset of rows;
   unioning results of processing the first and second branches to generate change data capture information showing changes made to the table in a specified time interval.

8. The machine-storage medium of claim 7, further comprising:

based on the scanning, generating rows from the table with a plurality of metadata columns, wherein a first metadata column indicates an original partition name for the respective row, wherein a second metadata column indicates an original row number for the respective row.

9. The machine-storage medium of claim 8, wherein a third metadata column includes a deleted flag indicating whether the respective row was deleted based on the plurality of row bitsets, wherein a fourth metadata column includes an updated flag indicating whether the respective row was updated based on the plurality of row bitsets, and wherein a fifth metadata column includes an inserted flag indicating whether the respective row was inserted based on the plurality of row bitsets.

10. The machine-storage medium of claim 9, wherein the first branch processes the first subset of rows that were deleted or updated based on the deleted and updated flags, and wherein the second branch processes the second subset of rows that were inserted based on the inserted flags.

11. The machine-storage medium of claim 10, further comprising:

in the first branch, setting an action attribute for each row in the first subset to delete and setting an update attribute for each row in the first subset based on the update flag.

12. The machine-storage medium of claim 11, further comprising:

in the second branch, setting the action attribute for each row in the second subset to insert and setting the update attribute for each row in the second subset based on the value of the original partition name for the respective row.

13. A system comprising:

at least one hardware processor; and at least one memory storing instructions that, when executed by the at least one hardware processor, cause the at least one hardware processor to perform actions comprising:

performing one or more operations on a table including at least a first micro-partition;

in response to performing the one or more operations, removing the first micro-partition and adding at least a second micro-partition;

generating a plurality of row bitsets for the micro-partitions involved in the one or more operations, the row bitsets indicating rows modified by the one or more operations, wherein the plurality of row bitsets include one inserted row bitset for marking newly inserted and new versions of updated rows, one deleted row bitset for marking newly deleted rows, and one updated row bitset for marking previous versions of updated rows, wherein the deleted and updated row bitsets are generated in a scanback row set operator (RSO) during one or more update, delete, or merge operations, wherein the inserted row bitsets are generated in an insert RSO during one or more insert, update, merge, or copy operations;

based on the plurality of row bitsets, scanning a subset of rows in the table, the subset of rows marked as being modified by the row bitsets;

splitting the scanned subset of rows into a first subset and a second subset, the first subset including rows that were newly deleted or newly updated and the second subset including rows that were newly inserted;

in a first branch, processing the first subset of rows;

in a second branch, processing the second subset of rows;

unioning results of processing the first and second branches to generate change data capture information showing changes made to the table in a specified time interval.

14. The system of claim 13, further comprising:

based on the scanning, generating rows from the table with a plurality of metadata columns, wherein a first metadata column indicates an original partition name for the respective row, wherein a second metadata column indicates an original row number for the respective row.

15. The system of claim 14, wherein a third metadata column includes a deleted flag indicating whether the respective row was deleted based on the plurality of row bitsets, wherein a fourth metadata column includes an updated flag indicating whether the respective row was updated based on the plurality of row bitsets, and wherein a fifth metadata column includes an inserted flag indicating whether the respective row was inserted based on the plurality of row bitsets.

16. The system of claim 15, wherein the first branch processes the first subset of rows that were deleted or updated based on the deleted and updated flags, and wherein the second branch processes the second subset of rows that were inserted based on the inserted flags.

17. The system of claim 16, further comprising:

in the first branch, setting an action attribute for each row in the first subset to delete and setting an update attribute for each row in the first subset based on the update flag.

18. The system of claim 17, further comprising:

in the second branch, setting the action attribute for each row in the second subset to insert and setting the update attribute for each row in the second subset based on the value of the original partition name for the respective row.

* * * * *